United States Patent [19]
Chan et al.

[11] Patent Number: 5,425,089
[45] Date of Patent: Jun. 13, 1995

[54] LOW COST TELEPHONE CALLER IDENTIFICATION DEVICE AND METHOD

[76] Inventors: John Y. Chan, 258 Crestview Dr., San Carlos, Calif. 95070; Wing J. Mar, 4303 Hansom Ct., Rohnert Park, Calif. 94928

[21] Appl. No.: 826,581

[22] Filed: Jan. 27, 1992

[51] Int. Cl.6 .................. H04M 1/00; H04M 1/66; H04M 9/00; H04M 13/00
[52] U.S. Cl. ................... 379/183; 379/182; 379/177; 379/171; 379/164
[58] Field of Search ............ 379/142, 188, 199, 200, 379/105, 102, 161, 171, 201, 184, 183, 189, 178, 177, 168

[56] References Cited
U.S. PATENT DOCUMENTS

| | | | |
|---|---|---|---|
| 4,528,424 | 6/1985 | Middleton et al. | 379/178 X |
| 4,578,540 | 3/1986 | Borg et al. | 379/200 X |
| 4,924,496 | 5/1990 | Figa et al. | 379/199 X |
| 4,937,854 | 6/1990 | Sarakas | 379/199 |
| 4,953,202 | 8/1990 | Newell | 379/200 |
| 4,975,943 | 12/1990 | Weber et al. | 379/200 |
| 5,127,045 | 6/1992 | Crasun et al. | 379/105 X |

*Primary Examiner*—Stephen Chin
*Assistant Examiner*—Paul Loomis
*Attorney, Agent, or Firm*—Skjerven, Morrill, MacPherson, Franklin & Friel; Alan H. MacPherson; Omkar K. Suryadevara

[57] ABSTRACT

The device and method of the present invention characterizes a telephone call by identifying a code, comparing the code to a predetermined access/ID code and generating a signal in response to the code. The device provides called party identification, calling party identification, and telephone number identification.

17 Claims, 9 Drawing Sheets

LOW COST TELEPHONE CALLER IDENTIFICATION DEVICE AND METHOD

BACKGROUND OF THE INVENTION

1. Field of the Invention

This invention relates to telephone systems and, in particular, to a method and apparatus for characterizing a telephone call by identifying the calling party, called party, or the called telephone number before the call is answered.

2. DESCRIPTION OF THE PRIOR ART

Frequently, people in a household share a single telephone. In that situation, an incoming call may be intended for only one person of the household, but until the telephone has been answered, that person has no way of knowing the "called" party. A person for whom the call is not intended might answer the telephone much to the inconvenience and discomfort of the called party.

Moreover, a called party may want to screen calls he or she answers. An answering machine allows a person to screen calls, but if the person fails to pick up the line, the answering machine indiscriminately takes messages from any caller who wants to leave a message, including unwanted callers, such as bill collectors and obscene callers.

In other situations, such as in a business, an incoming telephone line is routed to many telephones. Therefore, when an incoming call is received, the called party may not answer the telephone because he or she does not know the identity of the "called party." Thus, another office worker may answer the telephone and then have to locate the called party.

Moreover, sometimes the employer wishes to prevent certain types of calls from being made. For example, the employer may wish to restrict the employees' telephone calls to a local area code. Or perhaps the employer wants to ensure that no calls with a particular prefix (i.e., "900") are made from the business.

Accordingly, a need exists for identifying the called party, the calling party, or the telephone number called before the call is answered.

SUMMARY OF THE INVENTION

In accordance with the present invention, a telephone line controller is provided which recognizes predetermined access codes and, then, responds to incoming or outgoing telephone calls. The controller, connected between a standard telephone line and at least one telephone, intercepts the incoming or outgoing telephone calls before the calls are answered, and provides features such as called party identification, calling party identification, or telephone number identification.

In response to incoming calls, the controller answers the telephone after the telephone rings and waits for an access code to be transmitted by the caller. Typically, the access code either identifies a particular caller, i.e. calling party identification, or identifies the intended recipient of the call, i.e. called party identification. If the caller inputs a valid access code, the controller responds to the access code by an audio or visual signal. Absent an access code, the controller either rings the telephone normally or generates a special signal to indicate that the caller has failed to input a valid access code. If the telephone is not answered after a predetermined time period, the controller disconnects the telephone from the telephone line. In one embodiment, an answering machine, connected in series with the controller, is used to answer the call. In this embodiment, the controller has sufficient power to generate a normal ring signal to activate the answering machine.

In response to outgoing calls, the controller, recognizing certain telephone number prefixes (such as "900") as they are dialed, automatically disconnects the telephone from the telephone line, thereby preventing the calls from being completed. In another embodiment, the controller prevents all calls by keeping the telephone disconnected from the telephone line until the user inputs a valid user's access code. After a valid access code is used, the caller hears a normal dial tone before dialing the intended telephone number.

In one embodiment of the present invention, the controller is powered directly from the telephone line and has both called party and calling party identification features. In another embodiment, the controller is powered by a separate AC adapter and/or battery and has called party, calling party, and telephone number identification features. Using a separate power source further allows the controller to include features, such as remote control of appliances and hierarchical cascading of telephones in an office.

DETAILED DESCRIPTION OF THE INVENTION

The telephone line controller of this invention is, in one embodiment, placed in relation to a standard telephone line and telephone equipment to either process incoming calls before the telephone is answered or to restrict outgoing calls. Because the telephone line controller is connected to the telephone line, the controller is designed to comply with FCC regulations for Direct Access Arrangement (DAA) to prevent noise from interfering with the normal operation of the telephone line. These regulations are well-known and, therefore are not described in further detail.

Figure 1:
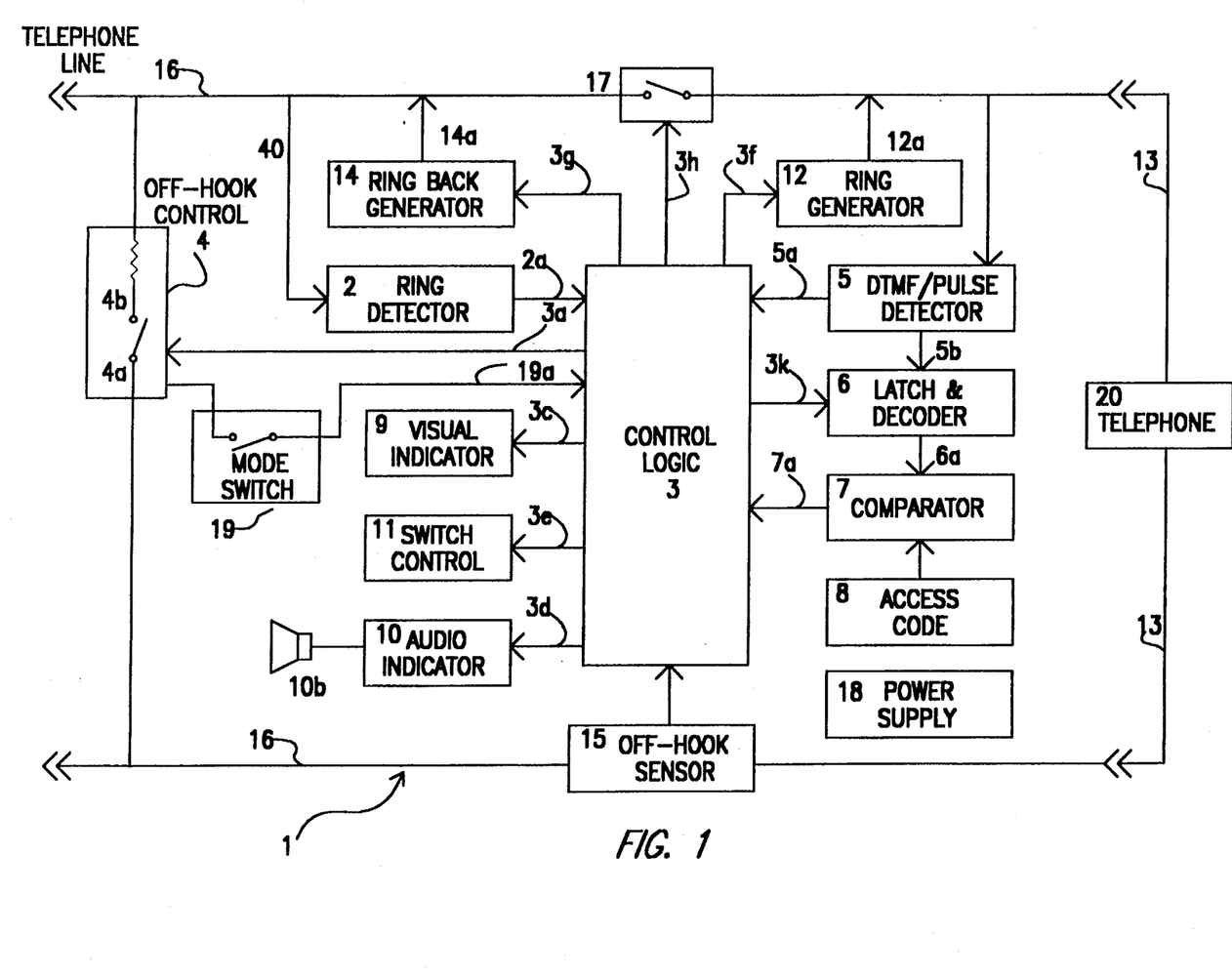
FIG. 1 illustrates a block diagram of a telephone line controller in accordance with the present invention.

FIG. 1 illustrates a telephone line controller 1 in accordance with the present invention that provides both incoming call identification and outgoing call restriction.

Processing Incoming Calls

In broad overview, when an incoming call rings the telephone 20, controller 1 intercepts the call and waits until an access code is received from the calling party. After receipt of an access code, controller 1 generates a visual or audio signal unique to that access code which identifies the caller, category of callers (i.e., relatives, friends, or business associates), or called party.

Figure 1A:
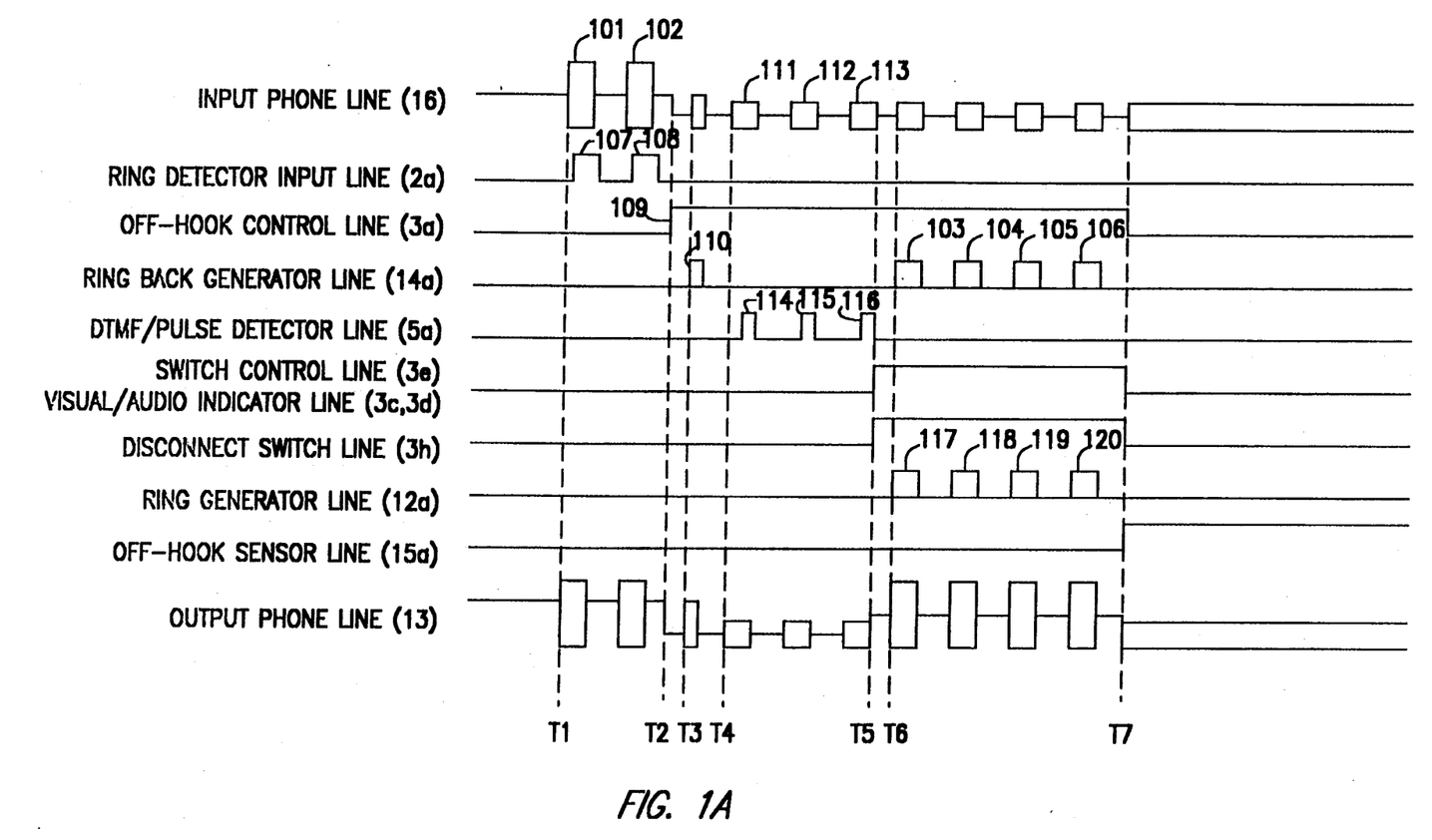
FIGS. 1A, 1B and 1C are timing diagrams illustrating the values of various signals during valid access code entry, no access code entry, and outgoing call access code entry, respectively, for the controller shown in FIG. 1.

When idle, an input telephone line 16 typically has a DC potential of approximately 48 volts. (Note that a telephone line typically comprises a plurality of physical wires. For simplicity, FIG. 1 does not distinguish between these wires.) When a caller places a call, the telephone company generates a ring signal which has a frequency of about 20 hertz and a voltage of 90 to 200 volts peak-to-peak. This ring signal is pulsed "on" for about 2 seconds and "off" for about 4 seconds. Referring to FIG. 1A, the first ring signal, input signal 101, is shown occurring at time T1 on input telephone line 16 (input into controller 1) and output telephone line 13 (output from controller 1). While FIG. 1A shows input signal 101 as a box, it should be noted that box 101 represents merely the envelope of the 20 hertz ringing signal. Box 102 likewise represents the envelope of the 20 hertz ring signal but for simplicity the actual signal is not shown within box 102. Note that when the disconnect switch 17 (FIG. 1) is closed (its normal state), input telephone line 16 and output telephone line 13 are connected. The ring detector 2 having a line 40 connected to input telephone line 16, monitors the ring signal to ensure the ring signal is of sufficient amplitude and duration before generating logic output signals 107, 108 (FIG. 1A) on line 2a (FIG. 1) to the control logic 3 indicating that a valid ring has occurred. In one embodiment, ring detector 2 is a simple voltage detector with a delay circuit. When the input signal exceeds a threshold voltage level, ring detector 2 generates an output signal which is delayed by a delay circuit to be discussed below in conjunction with FIG. 2A. Thus, an output signal is generated on line 2a only if the input signal exceeds the threshold voltage for a sufficient length of time. In this manner, ring detector 2 prevents false triggering by other signals such as voice, ringback, dial tone (which have insufficient amplitude), or spikes (which have insufficient duration).

After receiving an output signal on line 2a from ring detector 2, control logic 3 either acts upon this output signal immediately or is programmed to wait until a predetermined number of rings (FIG. 1A shows two rings, i.e., input signal 101 and 102) has occurred to allow the called party to answer the call without activating the controller.

Control logic 3 controls the operation of the various output function blocks, i.e., switch control 11, visual indicator 9, audio indicator 10, disconnect switch 17, ring generator 12, ring back generator 14, and the latch 6, based on the input signals from the input function blocks, i.e., ring detector 2, off-hook sensor 15, DTMF/Pulse detector 5, and mode switch 19. In typical embodiments, control logic 3 comprises either discrete logic gates or a micro-controller, such as the 80C31 by Intel or the 68HC05 by Motorola. The hardware cost for either embodiment is substantially the same. The micro-controller embodiment requires that a control program (firmware) be developed and placed in ROM which is part of the micro-controller, therefore somewhat increasing the total development time. However, this embodiment also provides the advantage of user flexibility because the firmware allows for the changing of access codes and identification features, thereby eliminating the cost of redesigning the hardware.

Referring to FIGS. 1 and 1A, control logic 3, in this instance programmed by the called party to act after two valid rings, issues a command signal 109 via control line 3a at time T2 to the off-hook control 4 to close the switch 4a. The closure of switch 4a places a load resistor 4b across input telephone line 16, thereby drawing enough current from input telephone line 16 to cause its DC voltage to drop below 10 volts. This voltage drop is interpreted by the telephone company as the receiving telephone receiver of telephone 20 being taken off-hook. As a result, the telephone company stops the ring signal and completes the connection between the caller and the controller 1.

At time T3, control logic 3 issues a command via line 3g to the ring back generator 14 to produce a short beep, signal 110, on line 14a. Because line 14a of ring back generator 14 is connected to input telephone line 16, the short beep is transmitted across this line as well, thereby alerting the caller that controller 1 is ready to receive the access code. Alternatively, a digitized voice message instructing the caller to enter the access code replaces the short beep. Note the digitized voice message minimizes confusion of first-time callers, but costs significantly more to implement than the short beep.

Referring to FIG. 1A, at time T4 the caller begins entering the access code in the form of Dual Tone Multi-Frequency (DTMF) signals 111–113 appearing on input telephone line 16 (as well as output telephone line 13). Note that DTMF signals are typically provided by a touch-tone pad. Further, note that although three DTMF signals are illustrated in FIG. 1A, the number of signals required for an access code is set by the number of switch packages in the comparator 7 (FIG. 1). Switch packages, shown in FIG. 2B, will be explained in detail later. The DTMF/Pulse detector 5, connected via line 5a to the output telephone line 13, detects in the embodiment shown, three incoming DTMF signals 111–113. There are 16 DTMF signals as currently defined and used by the telephone industry. Each DTMF signal is comprised of two tones with precisely specified frequencies. Hence, DTMF/pulse detector 5 requires two bandpass filters to detect each DTMF signal, resulting in 32 filters for detecting all 16 possible DTMF signals.

The pulse detector of DTMF/pulse detector 5 typically comprises a counter that counts the incoming pulses from a rotary telephone. Because most modern telephones use DTMF signals for dialing, the pulse detector may be unnecessary and may be optionally deleted.

In response to a valid access code input, DTMF/Pulse detector 5 typically transmits an output signal in a 4-bit binary code corresponding to the digits entered by the caller. Note that four bits allow up to 16 decimal numbers to be represented. Referring to FIG. 1, DTMF/Pulse detector 5 notifies control logic 3 (see signals 114–116 in FIG. 1A) via line 5a of incoming DTMF/Pulse digits. Control logic 3 then commands the latch 6 via control line 3k, to store the incoming digits transferred from the DTMF/Pulse detector 5 via data lines 5b. The comparator 7 compares a preprogrammed access code 8 (later described in further detail) to the stored digits in latch 6 (transferred on line 6a) and then informs control logic 3 via line 7a whether or not the incoming digits constitute a valid access code. Latch 6 comprises any common memory element, such as the 74HC373 octal D-type latch (from Texas Instruments or other manufacturers), or a register in a microprocessor. In one embodiment, comparator 7 is either a 74HC85 4-bit magnitude comparator (also from Texas Instruments or other manufacturers) or simply a COMPARE instruction of a microcontroller. Access code 8 is typically implemented using memory elements or simple switches set for a particular access code.

Assuming a valid access code has been entered, control logic 3 simultaneously and optionally activates the following elements at time T5: the switch control 11 via line 3e, the visual indicator 9 via line 3c, the audio indicator 10 via line 3d, and the disconnect switch 17 via line 3h. For example, in one embodiment of the present invention, switch control 11 has one switch connected to the air conditioner and another switch connected to the garage door opener. If the user assigns access code "100" to turn on the air conditioner at home, "101" to turn off the air conditioner, "200" to turn on the garage door opener, and "201" to turn off the garage door opener, then the user can call home and enter "201" to turn off the garage door opener as he or she leaves for the office in the morning to prevent a possible stray signal from inadvertently opening the garage door. Similarly, in the afternoon before the user leaves the office to return home, he or she can call home and enter "100" to turn on the air conditioner so that the house will be cooled before arrival.

As mentioned above, either or both visual indicator 9 and audio indicator 10 are used for caller and/or called party identification. For example, in one implementation of the invention, a flashing red light emitting diode (LED) corresponding to an access code of 9999 identifies Dad as the calling party; a non-flashing red LED corresponding to an access code of 9000 identifies one of Dad's friends as the caller; a flashing green LED corresponding to an access code of 8888 and a non-flashing green LED corresponding to an access code of 8000 identify the caller as Mom and one of Mom's friends, respectively; and a flashing blue LED corresponding to an access code of 7777 and a non-flashing blue LED corresponding to an access code of 7000 identify the caller as Junior or one of Junior's friends, respectively. Furthermore, in this example, audio indicator 10 is used for called party identification. Specifically, a special sound from audio indicator 10 of a bomb exploding, corresponding to an access code of 7007, identifies Junior as the called party. Hence, when the telephone rings with the red flashing LED on the controller, Mom and Junior know Dad is calling home, and if an exploding bomb sound is heard, Mom or Dad knows the caller wants to speak to Junior.

Consider another example of three people who share a common telephone line in a company, each person being given an access code which activates audio indicator 10 to provide a unique sound corresponding to each access code. In this manner, when a person's unique sound is heard, the other two people know the incoming call is not for them. If each person is given multiple access codes, calling party identification is also possible, i.e., each person determines which access code is given to whom or to what group of persons (for example, family or business associates).

Typically, as mentioned previously, disconnect switch 17 is closed to connect the input telephone line 16 to the output telephone line 13. Control logic 3, triggered by receipt of an access code, commands disconnect switch 17 to open via signals on line 3h at time T5, thus disconnecting output telephone line 13 from input telephone line 16 and allowing the ring generator 12 to ring telephone 20 without affecting input telephone line 16.

At time T6, the ring back generator 14 is turned "on" to simulate the ring back signal that a caller normally hears as audio feedback while waiting for the call to be answered. As shown in FIGS. 1 and 1A, ring back generator 14 provides four simulated ring back tones 103–106 on line 14a starting at time T6. The ring back tone consists of two tones with the frequencies of 440 hertz and 480 hertz mixed together which is pulsed "on" for about 2 seconds and "off" for 4 seconds. Ring back generator 14, in one embodiment, is constructed with three oscillators: two oscillators operating at approximately 440 hertz mixed together, which are gated by a third low frequency oscillator with a 2 second "on" and 4 second "off" signal.

At the same time ring back generator 14 generates the ring back signal for the caller starting at time T6, the ring generator 12 produces ring signals 117–120 for the called party. (Ring generator 12 also generates a signal to trigger succeeding telephone devices if used.) A typical ring signal, as described previously, is produced with a 20 hertz sinusoidal oscillator gated by a low frequency oscillator with the appropriate duty cycle. Using this configuration, a power amplifier with a step-up transformer is also required to provide sufficient signal drive and amplitude on output line 13 to resemble a normal ring signal. This ring signal is necessary for: 1) controlling and/or activating other telephone-based equipment, and 2) hierarchical calling structure. These two cases are described below.

Most automatic, telephone-based machines, such as telephone answering machines, fax machines, and modems, rely on a ring signal for activation. Consider, for example, powering-up and communicating with a home computer using a modem which is connected to output telephone line 13. Two calls are typically required to communicate with a home computer. The power switch of the computer is controlled by switch control 11 which is remotely operated with a special access code, such as 5011. Therefore, when controller 1 answers the first call, the caller enters access code 5011 to turn on the computer, which then executes a communication program to ready its modem. Note that because the disconnect switch 17 is normally closed, the initial ring signal from the telephone company also appears at the computer modem. Hence, controller 1 must be programmed to answer the call with fewer rings than the home computer modem to ensure proper operation. The caller then uses a modem to call controller 1 a second time, using another access code, for example 5012, to turn on the ring generator 12, which subsequently activates the home computer modem. Once the home computer modem answers the call, controller 1 disconnects itself from telephone line 16 by opening switch 4a of off-hook control 4, allowing communication between the two modems to occur normally. Using this configuration, the computer is turned on only as needed and input telephone line 16 can be used for other calls.

Figure 3:
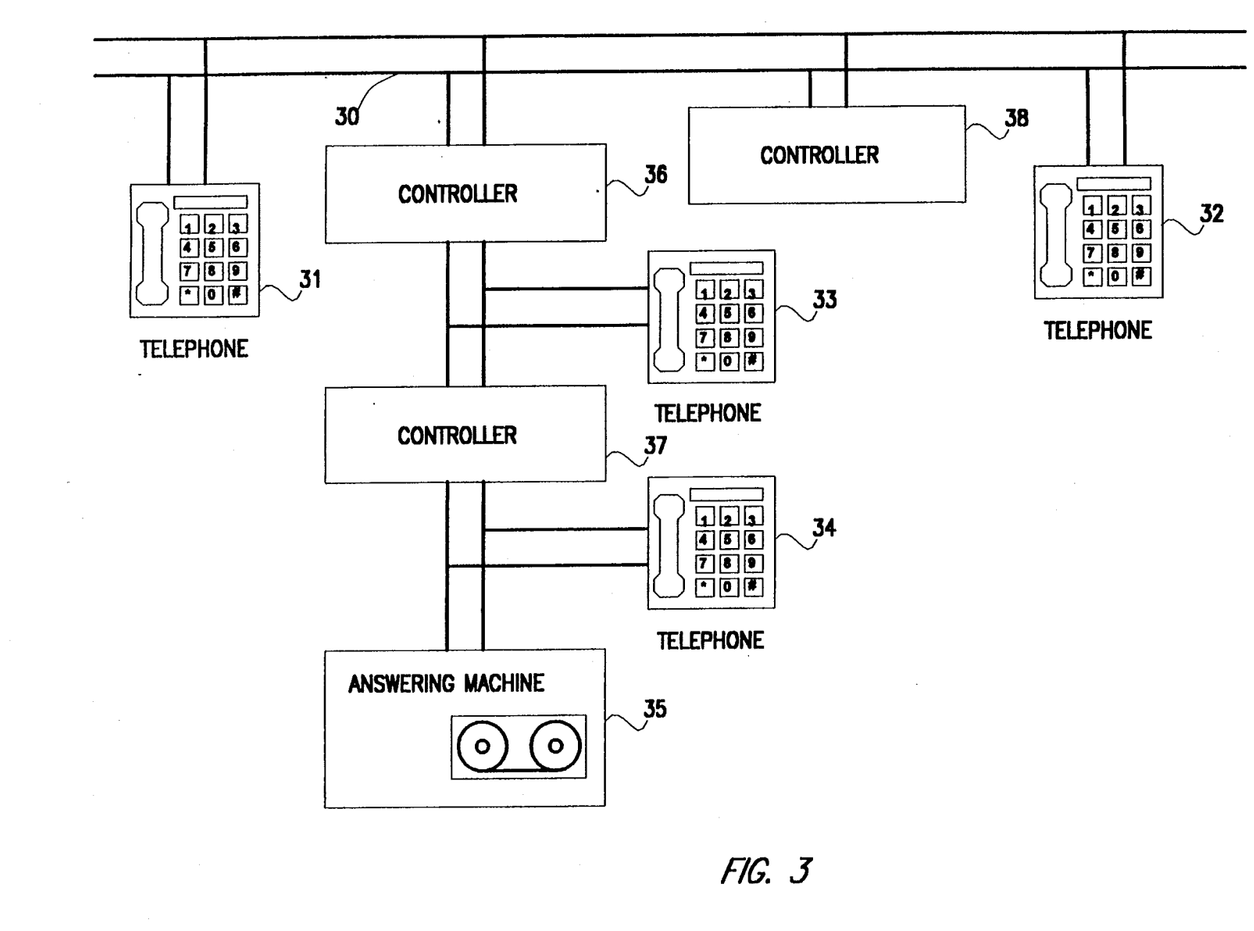
FIG. 3 shows possible connections of the controller to a telephone line.

The hierarchical calling structure connects several controllers in series, i.e., the output telephone line 13 of one controller is connected to the input telephone line 16 of the succeeding controller, to allow various levels of access to the caller. Controller 36 and controller 37 in FIG. 3 illustrate a hierarchical calling structure. Controller 36 is programmed to answer the call with fewer rings than succeeding controller 37 to avoid premature activation of controller 37. In one application, for example, telephone 33 and controller 36 are located at a secretary's desk while controller 37, telephone 34, and the answering machine 35 are located at the boss's desk.

One of the access codes for controller 36 activates its ring generator to ring telephone 33 while another access code activates controller 37. In this manner, the boss who is calling into the office has the choice of speaking to the secretary or accessing messages on answering machine 35 via controller 37.

Because most automatic, telephone-based equipment (including the controller) responds to the ring signal and grabs the incoming telephone line 16 after activation, no two such machines are connected to the same telephone line without conflict. Hence, for example, a telephone answering machine cannot normally be connected in parallel with a modem or a controller. Therefore, in order for more than one controller to be connected in parallel with another controller, one controller is designated "master" while the other is designated a "slave". In FIG. 3, controller 36 is designated "master" while controller 38 is designated as "slave." In this configuration, controller 36 controls input telephone line 30, but controller 38 still monitors the incoming access code and takes appropriate action. Note that mode switch 19, shown in FIG. 1, commands control logic 3 to configure controller 36 as either "master" or "slave."

Returning to FIGS. 1 and 1A, telephone 20 is picked up at time T7. The off-hook sensor 15, sensing the telephone being placed off-hook by voltage changes on line 13, informs control logic 3 of this condition via line 15a. Control logic 3 immediately suspends all controlling-/displaying actions that were initiated at times T5 and T6. Additionally, control logic 3 opens the off-hook control switch 4a via line 3a so as not to load down input telephone line 16. The now off-hook telephone 20 replaces the load resistor 4b to keep the loop current flowing, thereby allowing a telephone conversation to begin.

Figure 2A:
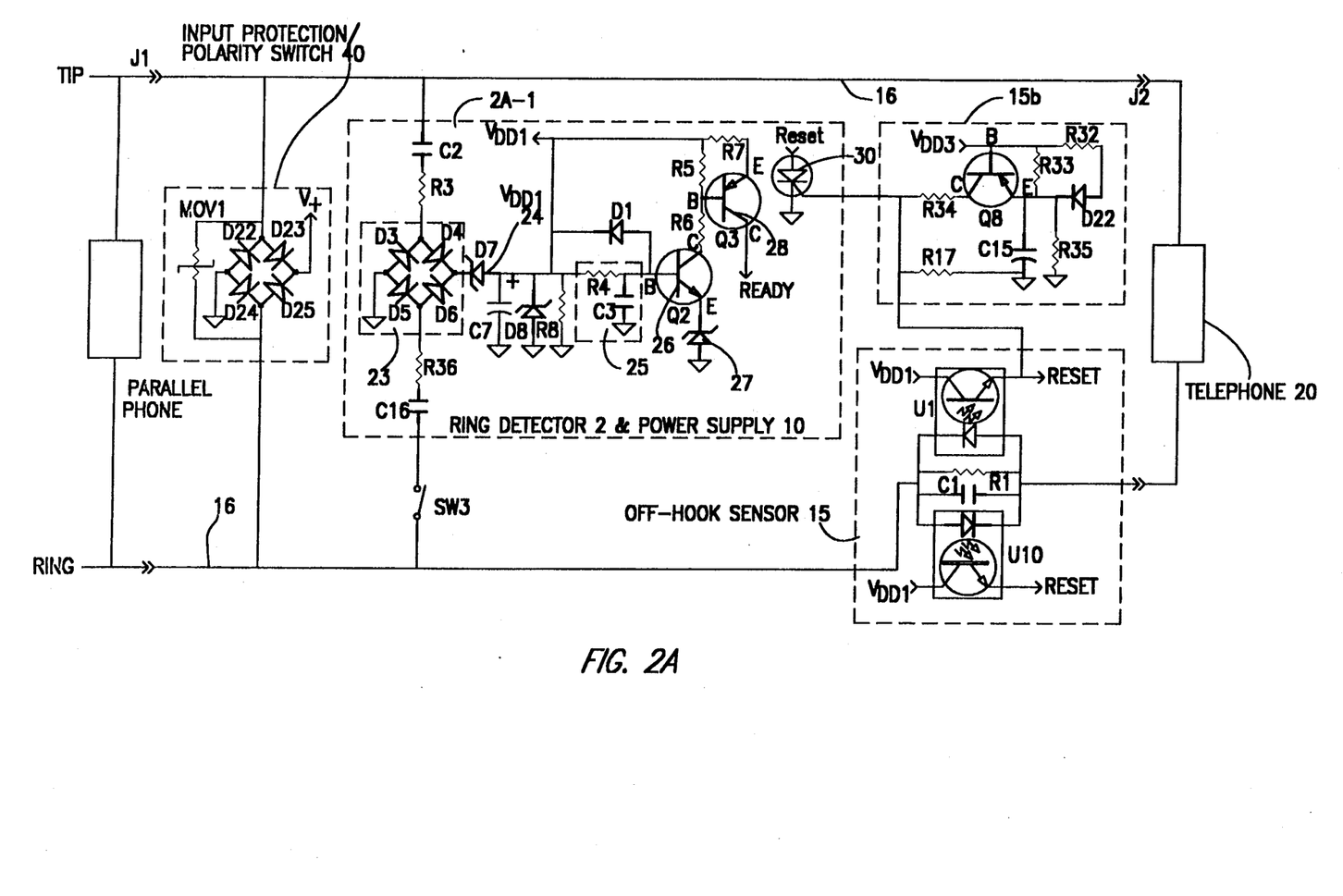
FIGS. 2A–2C illustrate schematic diagrams of one embodiment of the invention.

Both parallel and series controller configurations require off-hook sensing. The parallel off-hook sensor is typically a voltage sensor that senses the drop in the telephone line voltage when a parallel telephone device is put off-hook and thus draws additional current from the telephone line. The series off-hook sensor can be either a voltage sensor or a current sensor. A current sensor is preferred in most embodiments because it is less susceptible to line voltage spikes or variations. Examples of both types of off-hook sensors are shown in FIG. 2A and will be described later in further detail.

Figure 1B:
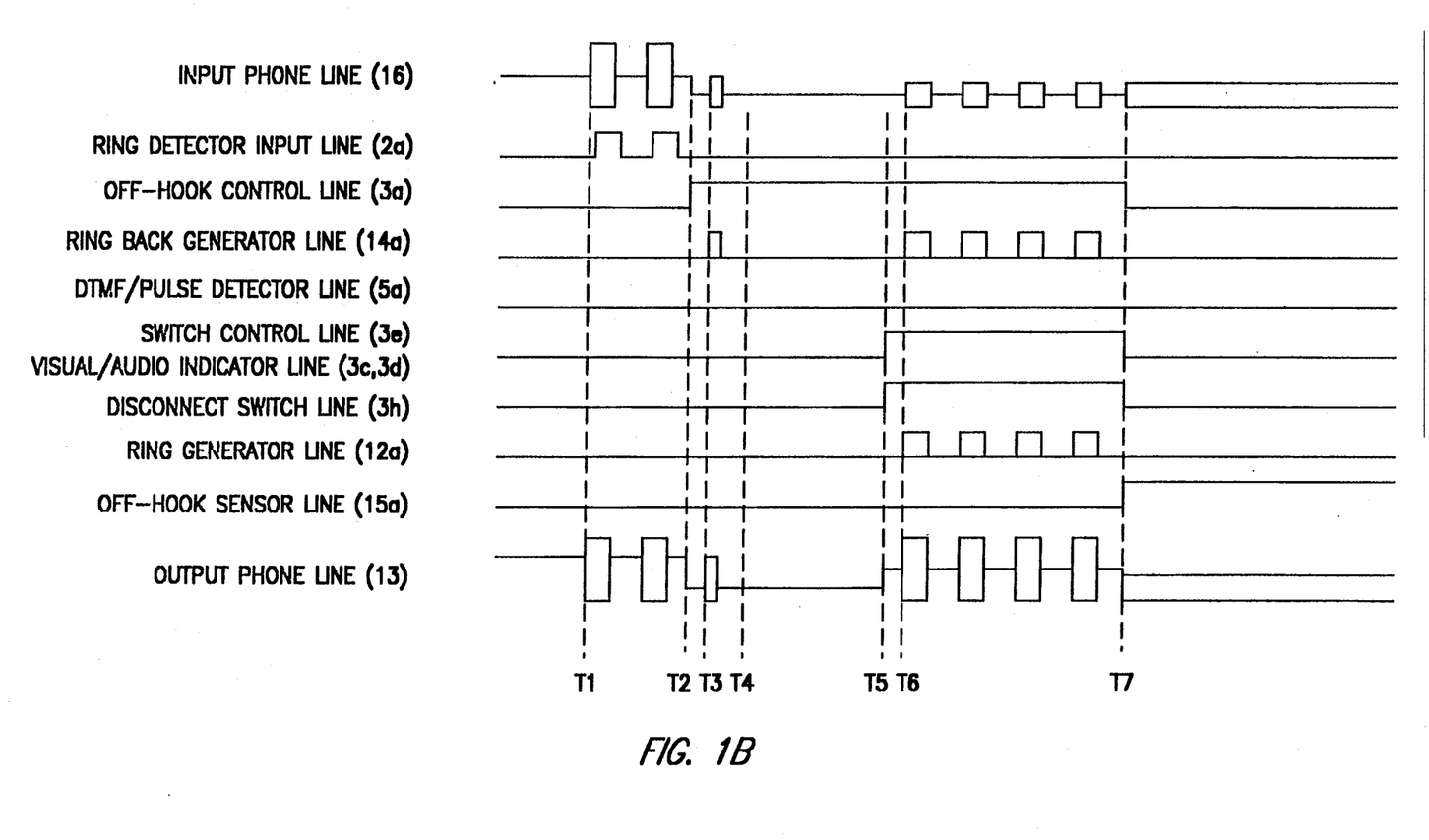

In contrast to the sequence of events occurring during a valid access code entry (using the timing diagram of FIG. 1A), FIG. 1B shows a case where no access code is entered and telephone 20 (FIG. 1) is not answered by the called party.

The sequence of events of FIGS. 1A and 1B are identical up to time T3 when ring back generator 14 beeps. However, as shown in FIG. 1B, the caller fails to enter any access code after time T4. Control logic 3 waits until time T5 to determine that no valid access code has been entered and then responds to the call by turning on ring back generator 14, and activating switch control 11, visual indicator 9, audio indicator 10, disconnect switch 17, and/or ring generator 12 as preprogrammed by the user. One user may want to simply turn on a yellow LED to identify the invalid or no access code calls, while another user may want to have the controller automatically terminate these calls at time T7 by releasing switch 4a. FIG. 1B shows telephone 20 being picked up at time T7.

As described above, the caller has the time interval between time T4 and time T5 to enter an access code. This time interval should be relatively short so that someone unfamiliar with the controller or not having an access code would not have cause to think anything was wrong with the call. For an access code consisting of 3 digits, a time interval of about 5 seconds is optimal. In another embodiment having a longer access code, a more sophisticated scheme is used. For example, assume the caller has 3 seconds to enter the first digit. However, once the first digit is correctly entered, more time is then allowed for the caller to complete code entry.

The time interval between time T6 (when the called party is alerted to the call) and time T7 (when the controller automatically terminates the call) is set for about 30 seconds, which is long enough for most calls to be answered. The time between the controller answering the call at time T2 and the controller terminating the call at time T7 is approximately 40 seconds. Consequently, a toll charge for a long distance caller is no more than 1 minute if the call is not answered. Additionally, in one embodiment, controller 1 is disabled via mode switch 19 (i.e., putting the controller in a slave mode) so that it will not answer any incoming calls. In this manner, a caller is not charged a long distance toll if no one answers the call.

Restricting Outgoing Calls

Figure 1C:
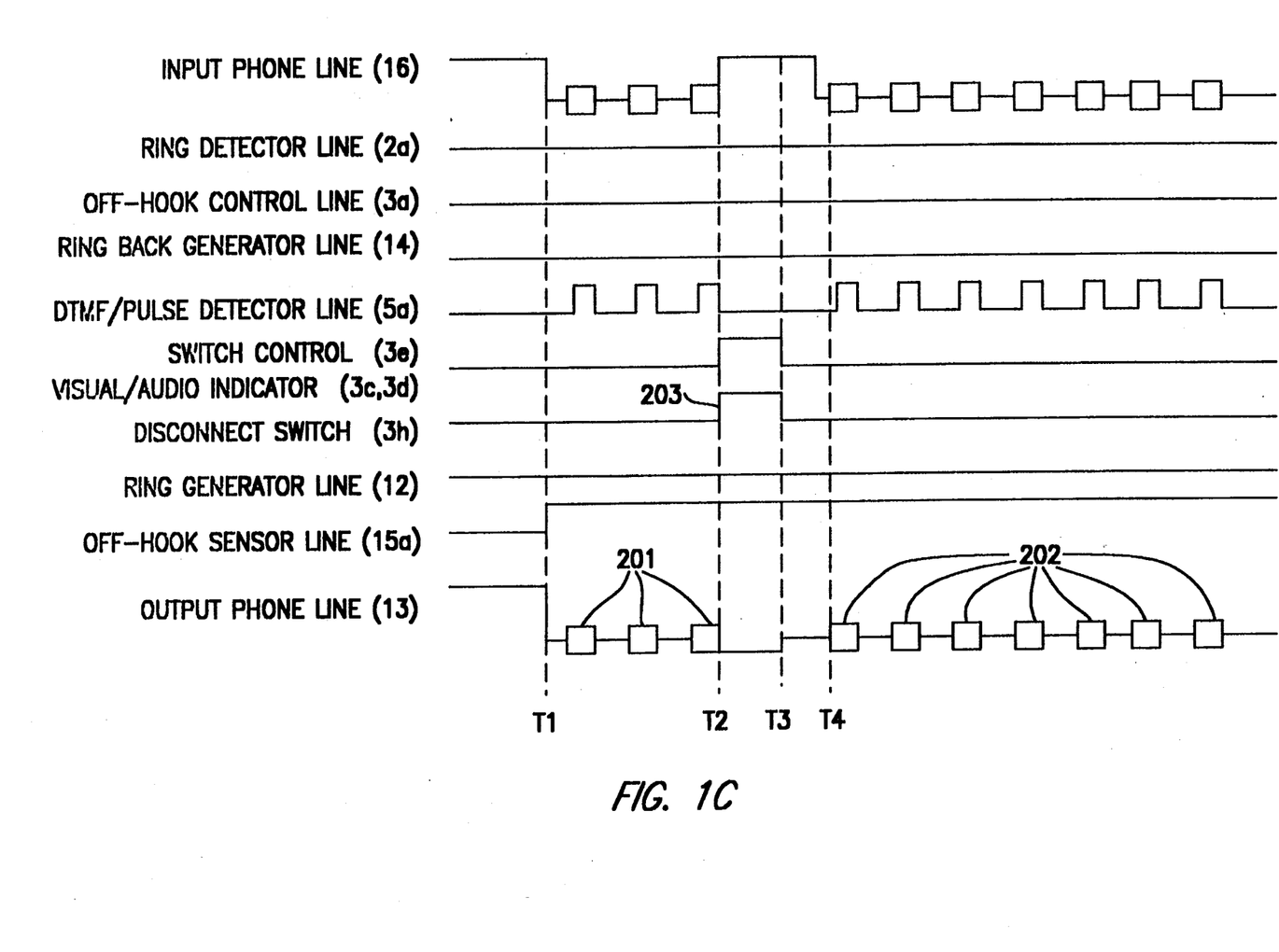

FIG. 1C shows a timing diagram of an outgoing call in accordance with the present invention. At time T1, the off-hook sensor 15 (FIG. 1) detects the telephone off-hook condition and prompts control logic 3 (via control line 15a) to start monitoring the output telephone line 13.

As shown by output telephone line 13 and input phone line 16 in FIG. 1C, the caller begins entering in the outgoing access code digits shortly after time T1. The DTMF/Pulse detector 5 detects the DTMF tone bursts 201 corresponding to the access digits. At time T2, the entered access code digits are compared to the previously-mentioned, pre-determined outgoing access code 8, in comparator 7. If a match occurs, comparator 7 issues a valid code signal to control logic 3 via line 7a. Control logic 3 then immediately activates the disconnect switch 17 via control line 3h (see signal 203), thereby momentarily disconnecting the output telephone line 13 from the input telephone line 16. This disconnection is equivalent to hanging up telephone 20 (i.e., the voltage across the input telephone line 16 returns to its idle level of about 48 volts at time T2). As a result, the telephone company ignores the previously entered 3 digits which comprised the access code.

To ensure the telephone company has recognized the disconnect signal, control logic 3 delays approximately 1 second, then commands the disconnect switch 17 to close, thereby reconnecting the input telephone line 16 to telephone 20. The telephone company interprets this reconnection as a new call and waits for the digits to be entered. At this time, the caller, hearing a normal dial tone, enters the intended telephone number (seen as DTMF tone bursts 202) without further interference from controller 1.

When the call is completed, control logic 3 again resets itself so that any new call must be preceded by a valid access code as described above. If the access code is not entered correctly from time T1 to time T2, control logic 3 again activates disconnect switch 17 to disconnect the telephone from the input telephone line 1 for about 1 second. In one embodiment, the disconnect time interval after a second invalid access code is entered is increased from 1 second to, for example, 10 minutes. Therefore, if a valid access code is not entered on the second try, experimenting with various digits becomes extremely time consuming.

In contrast to controlling all outgoing calls with an access code as described above, selective control based on the entered telephone number is also possible. In one example, control logic 3 monitors the digits of the telephone number dialed after time T1 to determine whether the first 3 digits match a predetermined (for example, a "900") code. If a match occurs, control logic 3 simply activates disconnect switch 17 to disconnect telephone 20 from input telephone line 16 temporarily, thus effectively stopping any calls with the predetermined prefix. Long distance calls or calls to some particular telephone numbers may also be similarly screened and stopped with the above method.

For effective outgoing call control, the telephone is permanently attached (i.e., soldered) in series to the output telephone line 13 of controller 1. Otherwise, a caller without a valid access code would simply bypass controller 1 by plugging the modular plug of telephone 20 directly into input telephone line 16. In addition, controller 1 is permanently attached to input telephone line 16 (which should have no other parallel connector to allow the controller to be easily bypassed).

A power supply 18, illustrated in FIG. 1, supplies the power needed to run the various functional blocks in one embodiment of the present invention. The actual connections between power supply 18 and the functional blocks are well-known in the art and, therefore are not shown in FIG. 1 for simplicity. Power supply 18 typically comprises a battery, an AC adapter, or both. If a micro-controller or a memory device is used for control logic 3 for storing the access codes, a battery is preferred for power backup during power outages. The power requirement is greatly influenced by the output actions of the control logic 3 chosen. For example, a ring generator for hierarchical calling requires much more power to ring successive ringers. Therefore, an AC adapter from a normal AC power line is mandatory for this configuration.

In another embodiment, controller 1 is constructed with low power consumption integrated circuits (as will be described in reference to FIGS. 2A-2C). In this manner, controller 1 operates entirely from the power obtained from the input telephone line 16. Thus, this embodiment offers cost savings and implementation time advantages. However, this embodiment fails to include some of the features such as rotary phone access code entry, outgoing call monitoring, or appliance control. Irrespective of its different power requirement, controller 1 of the embodiment described in FIGS. 2A-2C operates in a manner similar to that described above.

As previously mentioned, the access code is comprised of a plurality of digits. Clearly, the more digits required to be input, the more difficult access code becomes. Hence, a typical "easy" access code comprises three digits. The three digit code is formed by two digits (access digits) that determine whether control logic 3 activates visual indicator 9, switch control 11, and/or audio indicator 10 at all, and one identification (ID) digit that determines the output actions (i.e., different audio or visual signals) of controller 1.

Figure 2B:
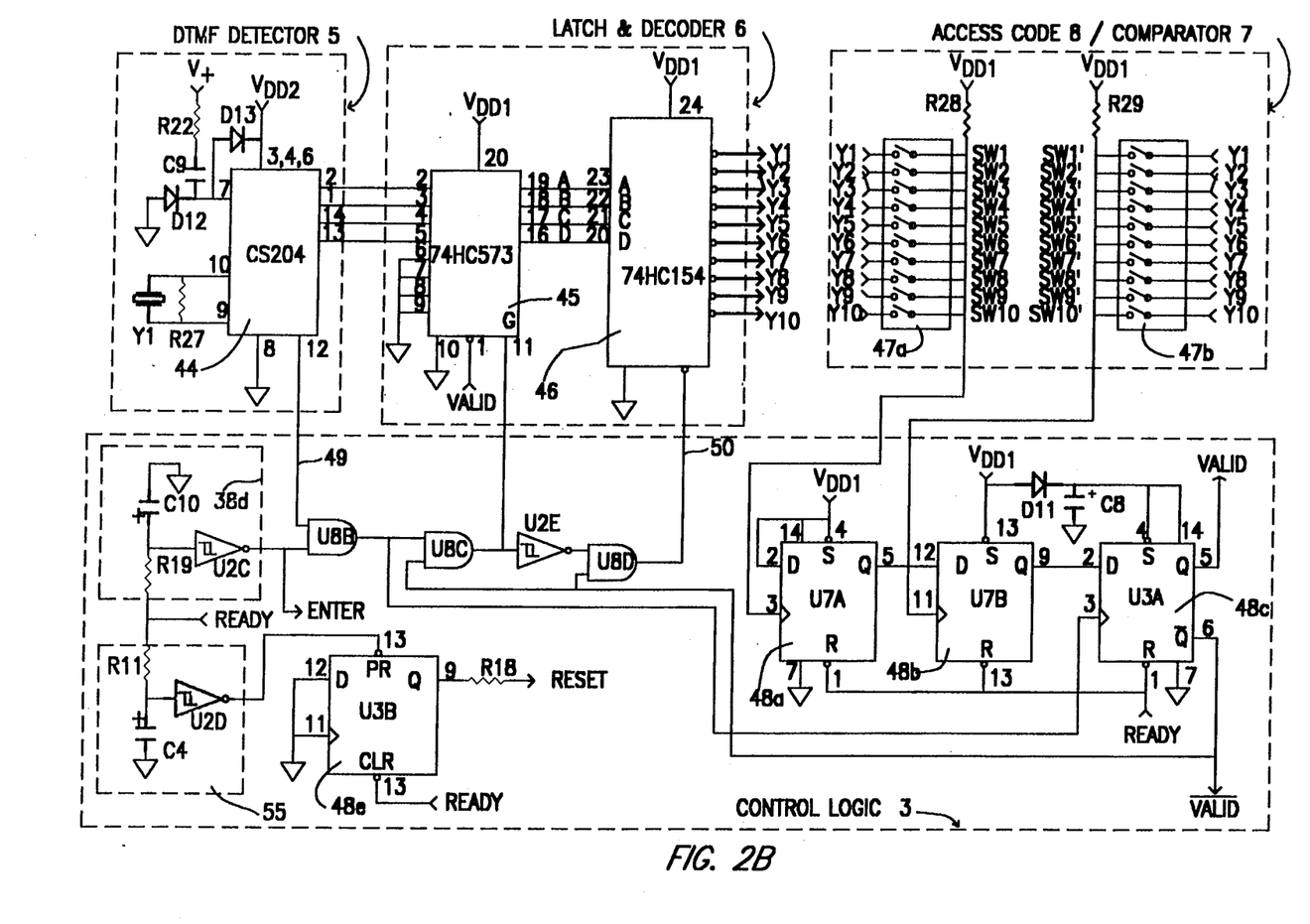
Figure 2C:
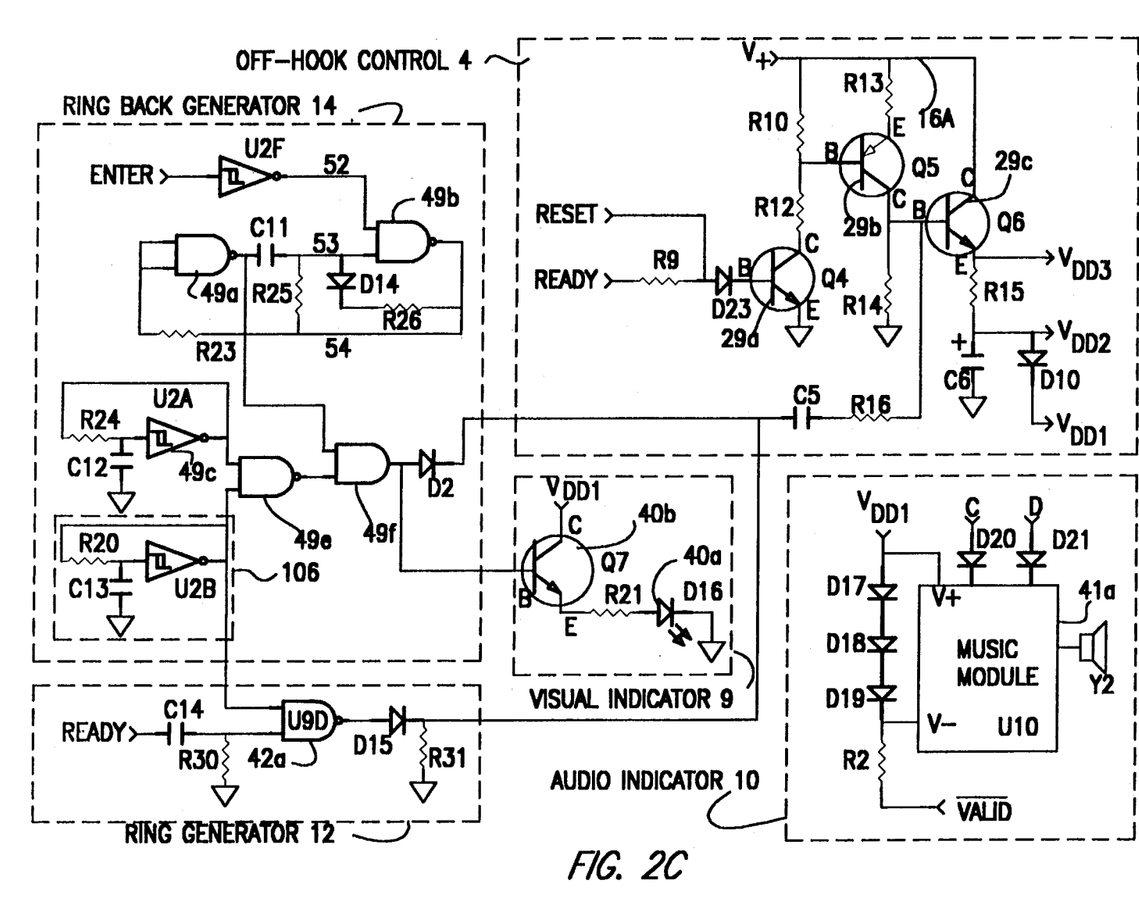

FIGS. 2A-2C illustrate one embodiment of the present invention. Elements having the same general configuration and serving the same function as in FIG. 1 have the same reference numerals.

Figure 2D:
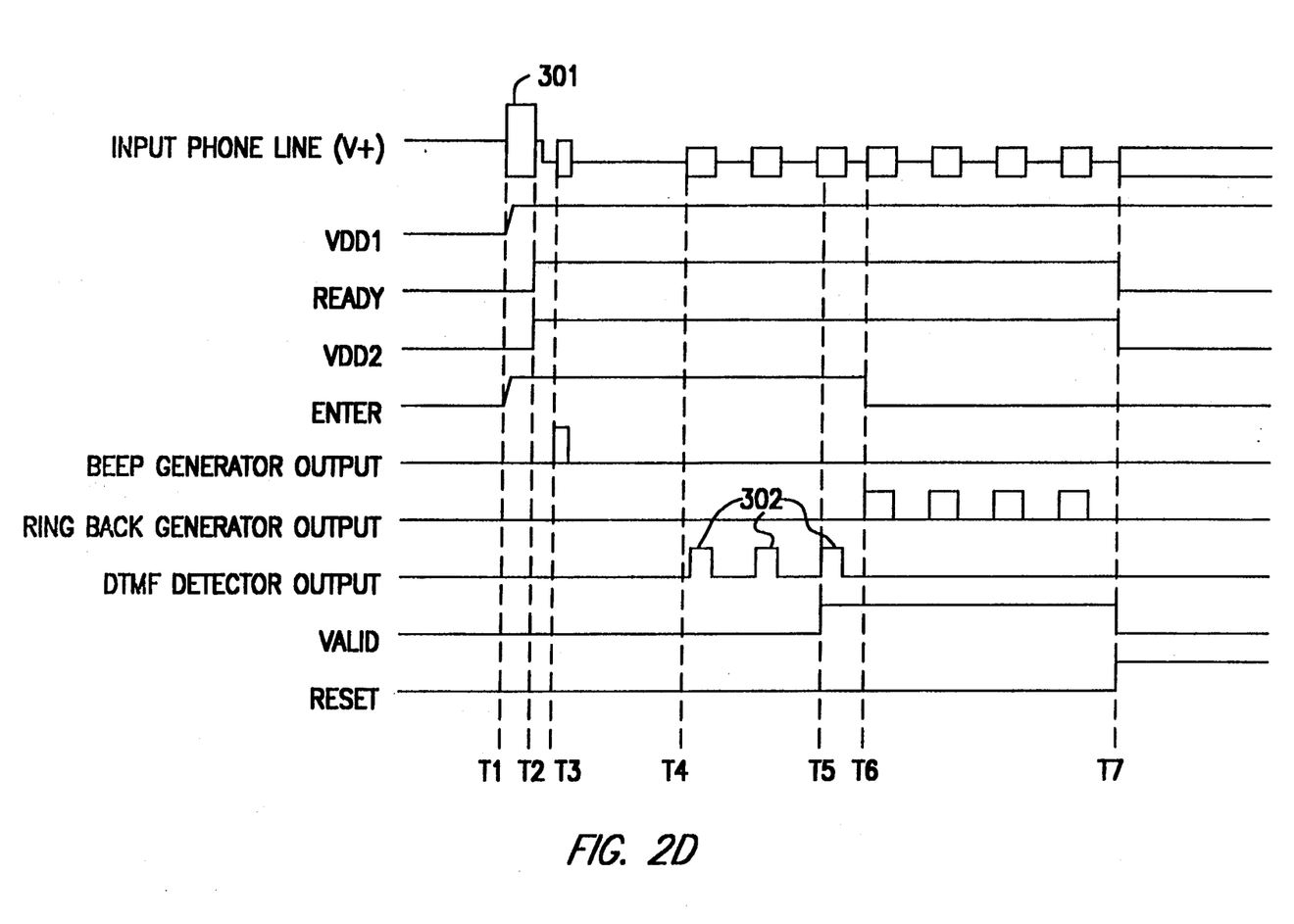
FIG. 2D is a timing diagram corresponding to the partial embodiment shown in FIGS. 2A–2C.

Referring to the ring detector 2 and power supply 18 illustrated within dashed-box 2A-1 in FIG. 2A, and the timing diagram of FIG. 2D, an AC ring signal 301 occurring at time T1 on input telephone line 16 is converted to a DC signal by the diode bridge 23 comprising rectifiers (D3–D6). A Zener diode D7 ensures that the ring voltage is sufficiently high before it is passed on to lead 24 as the supply voltage $V_{DD1}$. Voltage $V_{DD1}$ is delayed by the RC network 25 comprising resistor R4 and capacitor C3, before it is applied to the base of NPN transistor 26, thus ensuring that the ring signal when rectified has a voltage above the combined breakdown voltage of Zener diodes D7 and D8. Because diode D7 has a much higher breakdown voltage than diode D8 (20 volts versus 4.6 volts, respectively), the threshold voltage for triggering ring detector 2 is primarily set by diode D7. Diode D8 is used as a voltage regulator to keep voltage $V_{DD1}$ constant at approximately 4.6 volts. In this manner, voltage $V_{DD1}$ may power other circuits.

As shown in FIG. 2D, voltage $V_{DD1}$ quickly increases after time T1 and stabilizes by time T2. During this time period, the voltage at the base B of transistor 26 lags behind voltage $V_{DD1}$ because capacitor C3 charges slowly through resistor R4 with a rather long time constant of 1 second. Thus, resistor R4 and capacitor C3 determine the duration of the ring signal before ring detector 2 is triggered.

To turn on NPN transistor 26, the voltage on capacitor C3 must be above the breakdown voltage of Zener diode 27 (2.4 volts) which is connected between the emitter of transistor 26 and ground, and the forward bias voltage (approximately 0.6 volt) of the base-emitter junction of NPN transistor 26 before transistor 26 is activated. Thus, Zener diode 27 prevents transistor 26 from turning on until the base voltage of transistor 26 is about three volts. Transistor 26 pulls down the voltage on the base B of PNP transistor 28. Therefore, transistor 28 does not turn on until transistor 26 turns on. In this manner, the READY signal provided by the collector C of transistor 28 remains low until voltage $V_{DD1}$ is at least three volts. A low READY signal keeps the memory logic elements of the control logic 3, illustrated in and described in detail for FIG. 2B, cleared until the supply voltage (explained in the following paragraph) is high enough to ensure predictable behavior of the circuit. As shown in FIG. 2D, the READY signal remains low until time T2.

The circuit initially relies on the power supplied by the ring signal as rectified by bridge 23 (see FIG. 2A) through voltage $V_{DD1}$. Most of the function blocks of controller 1 are powered by this voltage. (Recall that typically the circuit is designed using logic elements that require very low operating power i.e., less than under static (non-switching) conditions.)

In contrast, the DTMF detector 5, illustrated in FIG. 2B, operates at a high frequency (i.e., a clock frequency of 3.57 MHz), thus requiring considerably more power to operate. Consequently, DTMF detector 5 is powered by voltage $V_{DD2}$, which is initially (i.e., prior to time T2 as shown in FIG. 2D) at 0 volts, to avoid loading the $V_{DD1}$ voltage derived from the ring signal.

Once transistor 26 (FIG. 2A) is turned on to generate a high READY signal, off-hook control 4, illustrated in FIG. 2C, is activated to draw DC power from telephone line 16 directly, thereby allowing the circuit to function without further ring signals. The READY signal going high forward biases the diode D23 and NPN transistor 29a of off-hook control circuit 4, allowing base current from PNP transistor 29b to flow through resistor R12 and NPN transistor 29a which turns on PNP transistor 29b. With transistor 29b turned on, the base voltage of NPN transistor 29c is pulled high toward voltage V+ (which is effectively provided by the input telephone line 16 as will be explained below), thereby turning on NPN transistor 29c. With transistor 29c on, voltage $V_{DD3}$ in combination with resistor R15 provides sufficient current (about 20 milliamps) to correspond to a telephone off-hook condition. This condition is sensed by the telephone central switch which terminates the signal and completes the connection between the caller and controller 1. In this embodiment, controller 1 is triggered at time T2 (as shown in FIG. 2D) which occurs immediately after ring detector 2 produces a valid output (i.e., the READY signal going high).

Voltage $V_{DD3}$ supplies power to voltage $V_{DD2}$ through resistor R15, which limits the line current. Voltage $V_{DD2}$ in turn supplies power to voltage $V_{DD1}$ to keep voltage $V_{DD1}$ constant even after the ring signal has been terminated. Diode D10 prevents the initial voltage $V_{DD1}$ derived from the ring signal from being drained by voltage $V_{DD2}$. As previously mentioned, voltage $V_{DD1}$ is regulated at 4.6 volts by Zener diode D8. Because voltage $V_{DD2}$ is one diode drop higher than voltage $V_{DD1}$ (about 0.6 volt due to diode D10), voltage $V_{DD2}$ is indirectly regulated at about 5.2 volts.

Voltage V+, provided to off-hook control 4 (see FIG. 2C) and input protection/polarity switch 40 (see FIG. 2A), is equivalent to the voltage on input telephone line 16 (see FIG. 1) during off-hook control. Transistor 29c of off-hook control 4 is equivalent to the off-hook switch 4a. Because controller 1 uses the power from input telephone line 16, the controller itself is equivalent to the off-hook load resistor 4b. Line 16A providing voltage V+ is technically not directly connected to input telephone line 16 shown in FIG. 1, but is instead indirectly connected through two forward-biased diodes in the optional input protection/polarity switch 40 which comprises diodes D22–D25 as is illustrated in FIG. 2A. As is known in the art, telephone lines have polarities. Thus, input protection/polarity switch 40 allows controller 1 to operate properly even if the physical wires of incoming telephone line 16 are reversed, i.e., if lines TIP and RING are reversed. Furthermore, a metal oxide varistor MOV1, connected across incoming telephone line 16, absorbs excessive voltage spikes, thus protecting controller 1, as well as telephone 20.

A single pole, single throw (SPST) switch SW3, shown in FIG. 2A, allows controller 1 to be bypassed. Specifically, when switch SW3 is open, controller 1 is disabled, thereby allowing incoming calls to go through to telephone 20 as normal calls.

The READY signal going high at time T2, as illustrated in FIG. 2D, in addition to triggering off-hook control 4 (shown in FIG. 2C), also triggers the ring generator 12 via capacitor C14, which is connected to one input line of NAND gate 42. The other input line of NAND gate 42a is connected to the relaxation oscillator 106 formed by Schmitt-trigger inverter U2B, feedback resistor R20, and timing capacitor C13. The high READY signal is transmitted across capacitor C14 which immediately enables NAND gate 42a, thereby allowing a beep signal from oscillator U2B to appear at the output lead of NAND gate 32a. As capacitor C14 is charged by the high READY signal through resistor R30, the voltage at the input lead of NAND gate 42a connected to capacitor C14 drops, eventually disabling NAND gate 42a after a short delay. Thus, only a short burst of single-frequency beeping tone is generated on the output lead of NAND gate 2a. This tone burst is transferred to a two-input diode OR gate formed by diodes D2 and D15. The output line 41 of the diode OR-gate is capacitively coupled to the base of transistor 29c via capacitor C5 and resistor R16. The tone burst appearing at the base of NPN transistor 29c modulates the line current, thereby alerting the caller by a short beep to start entering the access code.

In one embodiment, DTMF detector 5, illustrated in FIG. 2B, comprises a highly integrated CMOS circuit 44 which includes built-in filters and tone decoders to generate the binary equivalents of an input digit (which is then sent to the latch 45). Whenever a valid DTMF digit is received, circuit 44 also generates a valid digit output signal which is transferred to control logic 3 via one input lead to AND gate U8B. Three valid digit output signals 302 from DTMF detector 5 are illustrated in FIG. 2D as occurring between times T4 and T6.

The latch and decoder 6 comprises, in one embodiment, a HCMOS transparent octal latch 45 that retains the output signals of DTMF detector 5 even after the input tones have disappeared. The decoder comprises, in this embodiment, a four-bit binary decoder 46, which converts the four-bit binary output signals from the latch 45 into sixteen distinctive output signals (i.e., $Y_1$, ..., $Y_{16}$, but note only the first 10 outputs are used because telephone number digits are from 0 to 9). Decoder 46 drives the access code 8/comparator 7, and also optionally provides the distinctive output signal for the ID digit of the access code, described earlier.

Access code 8/comparator 7 comprises two dual in-line switch packages 47a and 47b. In one embodiment, each switch package contains ten individual switch elements SW1–SW10 and SW1'–SW10'. By selectively setting (i.e., closing) one or more switch elements in switch packages 47a and 47b, matching output signals from decoder 46 pass through the switches to clock components 48a and 48b, D flip-flops for example, within control logic 3.

For illustration, switch 47a is set by the user for "7" and switch 47b is set for both "7" and "0". Thus, in FIG. 2B, switches 47a and 47b allow for access codes of "77" and "70". If the first access code digit is entered correctly as a "7", the output line Y7 from decoder 46a becomes active. Because switch 47a is set such that line Y7 is connected to the clock input of clock component 48a, an active line Y7 enables clock component 48b to receive the next digit through switch 47b. If the next digit is a "6" the output line Y6 from decoder 46a becomes active However, because line Y6 is not connected by switch 47b to clock component 48b, Y6 being active has no effect on clock component 48b. Thus, switches 47a and 47b are the access code masks against which the input digits are compared. Because the switches themselves determine whether the input digits match the access digits, switches 47a and 47b thus also act as comparators.

The ENTER signal provided by the output line 38d of Schmitt-trigger inverter U2C (in control logic 3) is used to gate the entry of access digits. Inverter U2C inverts the low READY signal and outputs a high ENTER signal. The ENTER signal temporarily remains high even after the READY signal has become high because capacitor C10, which is connected to the input lead of inverter U2C, delays the input signal as the high READY signal slowly charges capacitor C10 via resistor R19. When the voltage across capacitor C10 finally surpasses the trigger level of inverter U2C, i.e., approximately 5 seconds after the READY signal becomes high, inverter U2C switches the ENTER signal from high to low as shown at time T6 in FIG. 2D.

When the ENTER signal is high, AND gate U8B is enabled, allowing the incoming digits from DTMF detector 5 to be processed by control logic 3. Initially, the data output terminal signals (Q outputs) of the four D flip-flops 48a, 48b, 48c, and 48e are set low because of the low READY signal.

The first access digit from switch 47a, as mentioned above, is applied to the clock input lead of flip flop 48a, thereby setting its Q output high. A high Q output in turn causes the data input terminal signal (D input) of flip flop 48b to go high. The second access digit from switch 47b is applied to the clock input lead of flip flop 48b to transfer the logic high at its D input to its Q output, which in turn causes the D input of flip flop 48c to go high. When the third digit (the ID digit) is entered by the caller, the DTMF detector 5 produces a high signal on output lead 49 to indicate that a valid DTMF digit is received. This valid DTMF signal, applied to one input lead of AND gate U8B, causes the signal on the output lead of AND gate U8B to go high. This high signal simultaneously enables AND gate U8C and clocks D flip-flop 48C. Clocking flip-flop 48C transfers the logic high at the D input to its Q output. This Q output is the high VALID signal, as shown in FIG. 2D at time T5. Hence, logic high VALID signal reflects that the three access/ID digits have been entered correctly. Complement signal $\bar{Q}$ (to Q output) of flip-flop 48C disables AND gates USC and USD by keeping one of the input signals low, thereby keeping the output signals of AND gates USC and USD low. The low output signal from AND gate USC, transferred to the enable input lead 11 of latch 45, also stops latch 45 from accepting any new inputs. Hence, the ID digit (i.e. the third digit entered) is retained in latch 45 even if the caller should enter additional digits and the DTMF detector 5 detects them as valid digits. The low output signal from AND gate U8D, transferred to the enable input leads via line 50 of decoder 46, keeps the output lines of decoder 46 enabled. Since the input signal to decoder 46 is the ID digit stored in latch 45, the ID digit thus turns on (set to low) and maintains the corresponding output line of decoder 46. For example, if the input ID digit is 3, the Y3 signal will be set to low until either phone 20 is picked up or the internal set time delay, controlled by resistor R11 and capacitor C4 in control logic 3, has expired.

When the five second delay is up at time T6 as shown in FIG. 2D, the ENTER signal goes low, thereby gating off AND gate USB and preventing the output signal from lead 49 of DTMF detector 5 from enabling latch 45 through AND gates USB and USC. Input digits from the caller at this point are still detected by DTMF decoder 5, but these inputs have no effect on any function of controller 1.

Ring back generator 14, as mentioned previously, is turned on after the initial five second delay for access code entry so that the caller will hear a simulated ringing signal, thereby alerting the caller that the call is waiting to be answered. Typically, ring back generator 14 comprises oscillators and logic gates. In one embodiment of ring back generator 14 shown in FIG. 2C, NAND gate 49a and NAND gate 49b form an oscillator. When the ENTER signal goes high between time T1 and time T2, its input signal to NAND gate 49b goes low. Therefore, the output signal of NAND gate 49b is always high irrespective of the other input signal to NAND gate 49b. This high output signal is provided as both input signals to NAND gate 49a through resistor R23, causing the output signal of NAND gate 49a to be low. The low output signal from NAND gate 49b charges capacitor C11 through resistor R25 and NAND gate 49b. When capacitor C11 is fully charged, the signal on the input lead of NAND gate 49b connected to capacitor C11 becomes high and the circuit is stable without further actions.

However, when the ENTER signal is low, the oscillator comprising NAND gates 49a and 49b is enabled. Specifically, a low ENTER signal is converted into a high signal by Schmitt-trigger inverter U2F. This high signal is provided as one input signal to NAND gate 49b. The other input signal is initially high as described above. The output signal of NAND gate 49b switches to a logic low because both of its input signals are high. A low output signal from NAND gate 49b causes the output signal of NAND gate 49a to go high. The high output signal from NAND gate 49a discharges capacitor C11 through the parallel combination of resistors R25 and R26 (with diode D14). As capacitor C11 discharges, the voltage on line 53 to NAND gate 49b begins to drop. Thus, NAND gate 49b outputs a high signal which is transferred to both input terminals of NAND gate 49a. Therefore, NAND gate 49a outputs a low signal, thereby initially providing a low signal on line 53. However, the high signal on line 54 through resistor R25 eventually causes the voltage on line 53 to rise. Hence, after a short delay, determined by the size of resistor R25 and capacitor C11, both input signals to NAND gate 49b become high. When the voltage on line 53 once again becomes high enough due to the charging capacitor C11, the output of NAND gate 49b goes low. This cycle repeats indefinitely as long as the ENTER signal is low.

Because capacitor C11 charges through resistor R25 and discharges through the parallel combination of resistors R25 and R26 (which has a combined resistance of about half of resistor R25) the discharge time is about twice as fast as the charge time, thereby resulting in the desired duty cycle for gating the ring back tone. As stated above, capacitor C11 charges and discharges when the output signal of NAND gate 49b is low and high, respectively. Therefore, the values of capacitor C11 and resistors R25, R26 are set such that the output of NAND gate 49b is high for approximately 2 seconds and low for approximately 4 seconds.

The output signal of NAND gate 49a is also applied to one input lead of AND gate 49f, which performs the actual gating of the ring back signal. The other input line to NAND gate 49f is coupled with the output line of NAND gate 49e, which produces the ring back signal by combining signals from two oscillators comprised, in one embodiment, of Schmitt-trigger inverters 49c and 49d. Oscillators 49c and 49d both operate at approximately 440 Hz. Hence, the simulated ring back signal comprises two input signals, as well as their beat notes (i.e., signals with frequencies of the sum and difference of the input signals). This ring back signal is gated "on" and "off" by the output signal of NAND gate 49a with AND gate 49f, resulting in the familiar two-second ring and four-second off signal.

To couple the ring back signal to telephone line 16 so that the caller can hear it, the output line from AND gate 39f is fed to one input, diode D2, of the 2-input diode OR gate (mentioned previously) to modulate the telephone loop current, as discussed with the ring generator 12 above, thereby transmitting the simulated ring back signal to be heard by the caller.

Because the ENTER signal goes low after a delay of about 5 seconds from the READY signal regardless of whether the correct access and ID digits have been entered, the caller will always hear the same ring back tone. In another embodiment, a special tone is generated for a valid access code entry.

A visual indicator 9, illustrated in FIG. 2C, is connected to the ring back generator 14. Visual indicator 9 comprises a light-emitting diode 40a driven from the emitter E of NPN transistor 40b. The base B of transistor 40b receives the gated output signal from AND gate 39f of ring back generator 14. Consequently, whenever ring back generator 14 is active, i.e., when a ring occurs, transistor 40b turns on which subsequently activates LED 40a.

The audio indicator 10, also illustrated in FIG. 2C, comprises, in one embodiment, a music module 41a that generates different tunes depending on how the signals applied to its two input leads C and D are controlled. The input signals are provided by the latched binary ID digit from latch 45 (see FIG. 2B). The latched signals are applied to input leads C and D through switching diodes D20 and D21, respectively. This particular music module is adapted from one commonly used in a musical greeting card and is typically powered by one or two cells (i.e., 1.5 volts or 3 volts). Because Voltage $V_{DD1}$ is approximately 4.6 volts, diodes D17–D19 are used to limit the supply voltage across music module 41a to about 2 volts for safe operation. When the complement VALID signal from flip-flop 38c $\overline{VALID}$, becomes low (i.e., approximately 1.2 volts) after a valid access/ID code has been received, music module 41a receives its power through resistor R2 and $V_{DD1}$ and plays the tune determined by signal provided by input leads C and D. If a valid access/ID code is not received, the $\overline{VALID}$ signal remains high, i.e., at approximately $V_{DD1}$ potential, and no voltage is applied to the music module 41a. Therefore, no tune is played.

The circuit configuration of the actual embodiment illustrated in FIGS. 2A–2C results in three distinctive tunes. The first tune is provided when only the signal on input lead D is high, which corresponds to an ID digit of 8, 9, or 0. The second tune is provided when only the signal on input lead C is high, which corresponds to an ID digit of 4, 5, 6 and 7. The third tune is provided when both signals on input leads C and D are low, which corresponds to an ID digit of 1, 2, and 3. In this case, four groups of callers can be identified by telephone line controller 1. For example, ID digits 8, 9, or 0 (which will result in a first tune from music module 41a) are assigned to Dad's friends; ID digits 4, 5, or 6 (which will result in a second tune) are assigned to Mom's friends; and ID digits 1, 2, or 3 (which will result in a third tune) are assigned to Junior's friends. Finally, the fourth group of callers are those who either were not given the access code or have entered the digits incorrectly, wherein the resulting calls will not generate any tune from controller 1. Using a different music module with more input leads increases the number of distinctive ID digits.

After the ENTER signal goes low at time T6 as shown in FIG. 2D, three previously discussed actions are initiated by controller 1: 1) the ring back generator 14 is activated to provide the caller with audio feedback, 2) the visual indicator 9 is activated to indicate controller 1 is answering the call, and 3) the audio indicator 10 is activated to identify the caller or called party. These three actions continue until either someone answers the call, or controller 1 shuts itself off after about 30 seconds, both actions being controlled through the RESET signal.

The RESET signal is provided on the input gate of silicon controlled rectifier (SCR) 30, as illustrated in FIG. 2A. Once triggered by a high RESET signal on its gate, SCR 30 becomes a forward-biased diode between its anode and its cathode. The anode of SCR 30 is connected to the anode of diode D23 in off-hook control 4 and the cathode of SCR 30 is connected to circuit ground. When the RESET signal goes high, SCR 30 turns on to shunt the READY signal going to the off-hook control 4 to ground, ultimately turning off transistor 29c to release telephone line 16. Once telephone line 16 is released, power to controller 1 is removed and controller 1 shuts itself down.

The RESET signal goes high whenever one of the two off-hook detectors is activated by a telephone being lifted off-hook. Two off-hook detectors are used in this embodiment to show the difference between parallel offhook sensing and series off-hook sensing.

Illustrated in FIG. 2A, serial off-hook detector 15A comprises, in this embodiment, two opto-isolators U1 and U10. Opto-isolators sense current through phone 20 to determine whether the receiver is off hook. Two opto-isolators are used so that regardless of the polarity of the telephone lines, one of the two opto-isolators will be able to sense the telephone off-hook condition. When the receiving telephone 20 is lifted off-hook, the telephone 20 draws current from telephone line 16. The line current passes through the telephone 20 and then through either the LED in opto-isolator U1 or the LED in opto-isolator U10, depending on the polarity of the telephone line. This causes either opto-isolator U1 or U10 to trigger SCR 30, which in turn causes the controller 1 to be disconnected from telephone line 16.

The off-hook detector 15A only detects the on/off hook conditions of any telephone connected in series with controller 1. The off-hook detector 15B, on the other hand, detects the on/off hook spikes of any telephone connected in parallel with controller 1. The circuit used in this embodiment of the invention relies on sensing relative voltage drops on the telephone when a receiver of another parallel phone is picked up. When controller 1 is triggered to draw current from the telephone line at time T3 (see FIG. 2D), the base B of the PNP transistor Q8, which is connected to voltage $V_{DD3}$, quickly reaches about 6 volts, while the emitter E voltage of transistor Q8 rises more slowly as capacitor C15 charges through resistor R32, parallel connected resistor R33, and diode D22 until finally reaching about 3 volts (due to the resistive divider formed by resistors R33 and R35). Hence, as long as voltage $V_{DD3}$ is rising up or staying at the same potential, the base-emitter junction of transistor Q8 is always reverse-biased to keep transistor Q8 off. When a telephone connected across telephone line 16 is put off-hook, the line voltage drops, causing voltage $V_{DD3}$ to drop accordingly ($V_{DD3}$ is indirectly connected across telephone line 16 via transistor Q6 of off-hook control 4 shown in FIG. 2C). If voltage $V_{DD3}$ quickly drops to about 2 volts, transistor Q8 is turned on because its emitter voltage still remains at close to 3 volts as capacitor C15 discharges slowly through the two rather large resistors, R33 and R35 (each resistor being 100 kilo-ohms). Transistor Q8 being turned on causes its collector to go highs thereby causing the RESET signal to go high through resistor R34 and triggering SCR 30 to turn off controller 1.

FIG. 3, as described previously, illustrates both parallel and series connected controllers that use offhook sensing as detailed above. Depending on the application, either or both types of sensing are used. Technically, series off-hook sensing is more reliable since a relatively large current, i.e., greater than 10 milliamps, is sensed by controller 1. In contrast, parallel off-hook sensing generally relies on sensing the voltage drop across telephone line 16 when additional telephone(s) are put off-hook. Factors such as line loading and variations in telephone characteristics (i.e., resistance and capacitance) greatly affect the actual telephone line voltage, making absolute voltage sensing difficult. Parallel off-hook sensing has the advantage in that when the incoming call has been answered by controller 1, picking up any telephone on the same telephone line is sufficient to cause controller 1 to disconnect itself from telephone line 16. Series off-hook sensing is necessary in the case of the hierarchical calling structure in which multiple controllers and telephones are connected in series.

The RESET signal is automatically pulled high by the time out circuit 55 shown in FIG. 2B formed mainly by resistor R11, capacitor C4, and Schmitt-trigger inverter U2D, after a 30 second delay from the READY signal going high if no one answers the telephone. This delay signal is produced by the high READY signal charging a relatively large capacitor, C4, through resistor R11. Capacitor C4, which is connected across the input of Schmitt-trigger inverter U2D, keeps the output signal of transistor U2D high until the voltage across capacitor C4 becomes sufficiently high to trigger it (i.e., set the output signal of transistor U2D low), resulting in the approximate 30 second delay. The low output signal of transistor U2D is applied to the SET input lead of flip-flop 48C, causing its Q output to go high, thereby setting the RESET signal high. A high RESET signal triggers SCR 30, which in turn shuts off the READY signal applied to the base B of NPN transistor Q4 through diode D23, thereby shutting off controller 1 as previously described.

FIG. 2D depicts telephone 20 being put off-hook at time T7 because input telephone line 16 remains loaded down after T7, i.e., telephone 20 replaces controller 1 as a load to telephone line 16 after controller 1 shuts itself off due to the high RESET signal. If no one answers telephone 20 and controller 1 automatically shuts itself off, input telephone line 16 returns to its idle state of about 48 volts of DC potential, while controller resets itself to wait for the next call.

Table 1 below lists illustrative materials for the various components illustrated in FIGS. 2A-2C.

TABLE 1

| Components | Representative Characteristics |
| --- | --- |
| J1, 2 | Telephone Modular Receptor |
| D3-D6 | 400 V Rectifier 1N4004 |
| D7 | 20 V/0.4 W Zener Diode |
| D8 | 4.6 V/0.4 W Zener Diode |
| D9 | 2.4 V/0.4 W Zener Diode (or 3 1N4150) |
| D1-2, D10-D15, D17-D23 | Switching Diode 1N4150 |
| D16 | Any Low-current LED |
| R1, 7 | 100-ohm/0.5 W |
| R8, 16 | 22-kohm/0.25 W |
| R3, 36 | 1.8-kohm/0.5 W |
| R4, 5, 10, 11, 19, 27 | 1-Mohm/0.25 W |
| R6, 9, 17 | 50-kohm/0.25 W |
| R28, 29, 33, 35 | 100-kohm/0.25 W |
| R12, 14 | 270-kohm/0.25 W |
| R2, 13, 18, 21, 34 | 1.2-kohm/0.25 W |
| R15 | 47-ohm/0.5 W |
| R22, 31 | 10-kohm/0.25 W |
| R32 | 3.3-kohm/0.25 W |
| R20, 23-26, 30 | 2.2-Mohm/0.25 W |
| MOV1 | 130 V Metal Oxide Varistor |
| C1 | 0.1 μF/50 V |
| C2, 16 | 2.2 μF/250 V |
| C3, 11 | 1 μF/25 V |
| C4, 15 | 47 μF/10 V |
| C12, 13 | 0.01 μF/50 V |
| C6, 7 | 100 μF/10 V |
| C9 | 0.01 μF/200 V |
| C8, 10 | 4.7 μF/10 V |
| C5, 14 | 0.1 μF/50 V |
| U1, 11 | Opto-isolator 4N26 |
| U2 | 74HC14 |
| U3, 7 | 74HC74 |
| U4 | CS204 DTMF Decoder |
| U5 | 74HC573 |
| U6 | 74HC154 |
| U8 | 74HC08 |
| U9 | 74HC00 |
| U10 | Low power music module or similar sound generator |
| Q1 | SCR 2N5060 or similar |
| Q2, 7 | 2N3904 |
| Q3, 8 | 2N3906 |
| Q4, 6 | MPSA42 |
| Q5 | MPSA93 |
| SW1, SW2 | 8 SPST DIP SW or 1 pole 10 position rotary SW |
| SW3 | 200 V SPST SW |
| Y1 | 3.57 Mhz Crystal |
| Y2 | Piezo Speaker |

While particular embodiments of the present invention have been shown and described, other embodiments will be obvious to those skilled in the art in view of the above disclosure. The components illustrated in FIGS. 2A-2C and listed above in Table 1 represent only one embodiment. Changes or modifications to any of these components are still within the scope of this invention. Therefore, the appended claims are to encompass within their scope all such changes and modifications as fall within the true spirit and scope of the invention.

We claim:

1. A device adapted to a telephone for characterizing a telephone call, said device being capable of operating with a plurality of similar devices connected in parallel on a telephone line, said device comprising:
   means for receiving an input code which identifies a calling party or a called party;
   means for generating a response to said input code; and
   means for configuring said device in either a master mode or a slave mode;

wherein when configured in said master mode said device controls said telephone line by causing said means for generating a response to provide an off-hook signal on said telephone line on interception of an incoming call on said telephone line, and when configured in said slave mode said device is capable of monitoring said telephone line for input codes after another device of said plurality of similar devices configured in said master mode has provided said off-hook signal.

2. The device according to claim 1, wherein said means for generating comprises visible means for signalling said response.

3. The device according to claim 1, wherein said means for generating comprises audible means for signalling said response.

4. The device according to claim 1, wherein said means for generating comprises means for controlling the operation of an appliance in response to said input code.

5. The device according to claim 1, wherein said input code comprises one or more digits of a first number entered by an outgoing caller, thereby enabling said device to characterize outgoing telephone calls in response to said input code.

6. The device according to claim 1, wherein said means for generating comprises means for controlling incoming telephone calls in response to said input code.

7. The device according to claim 1, wherein said means for receiving comprises:
   a predetermined access code;
   means for comparing said input code to said predetermined access code, said means for comparing having an input signal and an output signal; and
   means for processing said output signal of said means for comparing, said means for processing having a plurality of output signals, wherein at least one of said plurality of output signals is connected to said means for generating a response.

8. The device according to claim 5, wherein said first number comprises an access code entered by said outgoing caller, said access code being indicative of said outgoing caller.

9. The device according to claim 5, said device storing a predetermined second number comprising a plurality of digits, said device further comprising:
   means for identifying said first number as said first number is entered; and
   means for disconnecting said telephone from said telephone line when a plurality of digits of said first number match a plurality of digits of said predetermined second number,
   wherein said first number comprises a telephone number.

10. A method of characterizing a telephone call with a plurality of caller identification devices connected in parallel on a telephone line, said method comprising the steps of:
   activating one of said devices to function as a master controller, said master controller then controlling said telephone line and monitoring said telephone line for input codes;
   activating any other device to function as a slave controller, said slave controller then limited to monitoring said telephone line for said input codes;
   providing parallel off-hook sensing for each of said master and slave controllers, such that picking up any telephone on said telephone line results in disconnection of any other controller;
   inputting a code which identifies a calling party or a called party; and
   generating a response to said code.

11. The method according to claim 10, wherein the step of generating a response includes producing an audible signal.

12. The method according to claim 10, wherein the step of generating a response includes producing a visible signal.

13. The method according to claim 10, wherein the step of generating a response includes controlling the operation of an appliance.

14. The method according to claim 10, wherein the step of generating a response includes controlling incoming telephone calls.

15. The method according to claim 10, wherein the step of inputting a code includes:
   storing a predetermined access code;
   comparing said code with said predetermined access code;
   producing an output action as a result of said comparing; and
   generating a signal in response to said output action.

16. The device according to claim 1, wherein said means for generating comprises a light emitting device.

17. The device according to claim 1, wherein said means for generating comprises a music module.

* * * * *